US006962666B2

(12) United States Patent
Ravet et al.

(10) Patent No.: US 6,962,666 B2
(45) Date of Patent: Nov. 8, 2005

(54) ELECTRODE MATERIALS WITH HIGH SURFACE CONDUCTIVITY

(75) Inventors: Nathalie Ravet, Montreal (CA); Simon Besner, Coteau-du-Lac (CA); Martin Simoneau, St Bruno de Montarville (CA); Alain Vallée, Varennes (CA); Michel Armand, Montreal (CA); Jean-François Magnan, Neuville (CA)

(73) Assignees: ACEP, Inc. (CA); Centre National de la Recherche Scientifique (FR); Universite de Montreal (CA)

( * ) Notice: Subject to any disclaimer, the term of this patent is extended or adjusted under 35 U.S.C. 154(b) by 0 days.

(21) Appl. No.: 10/740,449

(22) Filed: Dec. 22, 2003

(65) Prior Publication Data

US 2004/0140458 A1 Jul. 22, 2004

Related U.S. Application Data

(62) Division of application No. 10/175,794, filed on Jun. 21, 2002, now Pat. No. 6,855,273, which is a continuation of application No. 09/560,572, filed on Apr. 28, 2000, now abandoned.

(30) Foreign Application Priority Data

Apr. 30, 1999 (CA) ............................................ 2270771

(51) Int. Cl.[7] .................................................. H01B 1/08
(52) U.S. Cl. ........................ 252/506; 252/509; 429/209; 429/218
(58) Field of Search ................................. 252/506, 509; 428/403; 429/209, 218

(56) References Cited

U.S. PATENT DOCUMENTS

| | | | | |
|---|---|---|---|---|
| 3,940,509 A | | 2/1976 | Youtsey et al. ............... | 252/508 |
| 4,018,943 A | | 4/1977 | Youtsey et al. ............... | 438/99 |
| 4,136,213 A | * | 1/1979 | Fung et al. .................. | 427/122 |
| 4,686,116 A | * | 8/1987 | Rickborn et al. ............ | 427/215 |
| 5,595,838 A | | 1/1997 | Yamada et al. .............. | 429/209 |

* cited by examiner

*Primary Examiner*—Mark Kopec
(74) *Attorney, Agent, or Firm*—Katten Muchin Rosenman L.L.P.

(57) ABSTRACT

The present invention concerns electrode materials capable of redox reactions by electrons and alkaline ions exchange with an electrolyte. The applications are in the field of primary (batteries) or secondary electrochemical generators, super capacitors and light modulating system of the super capacitor type.

50 Claims, 6 Drawing Sheets

FIGURE 1
a) b)
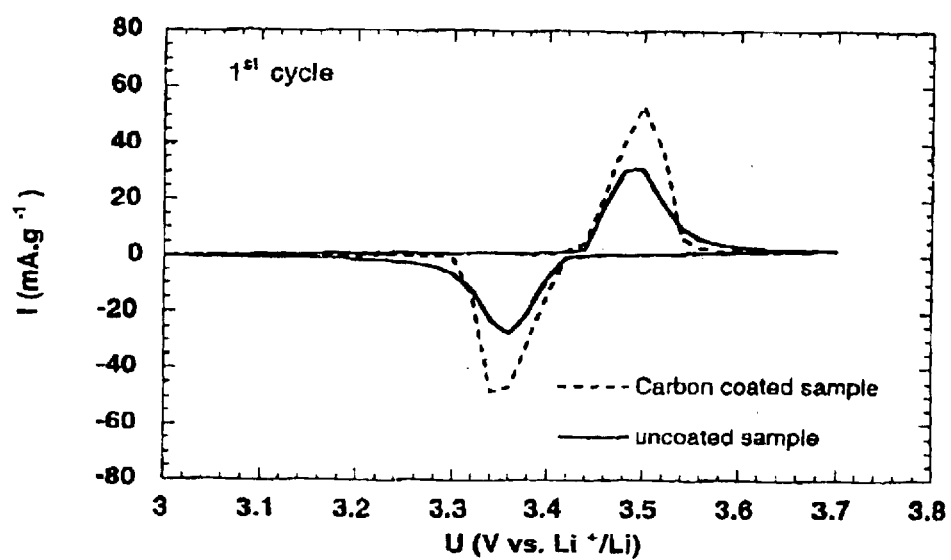
Figure 2

ELECTRODE MATERIALS WITH HIGH SURFACE CONDUCTIVITY

This application is a DIV of Ser. No. 10/175,794 (filed Jun. 21, 2002, now U.S. Pat. No. 6,855,273), which application is a CON of Ser. No. 09/560,572 (filed Apr. 28, 2000, now ABN).

FIELD OF INVENTION

The present invention concerns electrode materials capable of redox reactions by electrons and alkaline ions exchange with an electrolyte. The applications are in the field of primary (batteries) or secondary electrochemical generators, supercapacitors and light modulating system of the electrochromic type.

BACKGROUND OF THE INVENTION

Insertion compounds (hereinafter also referred to as electroactive materials or redox materials) are well known, and their operation is based on the exchange of alkaline ions, in particular lithium ions, and valence electrons of at least one transition element, in order to keep the neutrality of the solid matrix. The partial or complete maintenance of the structural integrity of the material allows the reversibility of the reaction. Redox reactions resulting in the formation of several phases are usually not reversible, or only partially. It is also possible to perform the reactions in the solid phase through the reversible scission of the sulphur-sulphur bonds or the redox reactions involved in the transformation of the aromatic organic structures in quinonoid form, including in conjugated polymers.

The insertion materials are the electrochemical reactions active components used in particular in electrochemical generators, supercapacitors or light transmission modulating system (electrochromic devices).

The progression of the ions-electrons exchange reaction requires the existence within the insertion material of a double conductivity, simultaneous with the electrons and the ions, in particular lithium ions, either one of these conductivities being eventually too weak to ensure the necessary kinetic exchanges for the use of the material, in particular for electrochemical generators or supercapacitors. This problem is partly solved by using so-called "composite" electrodes, wherein the electrode material is dispersed in a matrix containing the electrolyte and a polymer binder. When the electrolyte is a polymer electrolyte or a polymer gel working in the presence of a solvent, the mechanical binding role is carried out directly by the macromolecule. Gel means a polymer matrix, solvating or not, and retaining a polar liquid and a salt, to confer to the mixture the mechanical properties of a solid while retaining at least a part of the conductivity of the polar liquid. A liquid electrolyte and the electrode material can also be maintained in contact with a small fraction of an inert polymer binder, i.e., not interacting with the solvent. With any of these means, each electrode material particle is thus surrounded by an electrolyte capable of bringing the ions in direct contact with almost the totality of the electrode material surface. To facilitate electronic exchanges, it is usual, according to the prior art, to add particles of a conductive material to one of the mixtures of the electrode material and electrolyte mentioned above. Such particles are in a very divided state. Generally, carbon-based materials are selected, and especially carbon blacks (Shawinigan or Ketjenblack®). However, the volume Fractions used must be kept low because such material modifies strongly the rheology their suspension, especially in polymers, thereby leading to an excessive porosity and loss of operating efficiency of the composite electrode, in terms of the fraction of the usable capacity as well as the kinetics, i.e, the power available. At these low concentrations used, the carbon particles structure themselves in chains, and the contact points with the electrode materials are extremely reduced. Consequently, such configuration results in a poor distribution of the electrical potential within the electroactive material. In particular, over-concentrations or depletion can appear at the triple junction points:

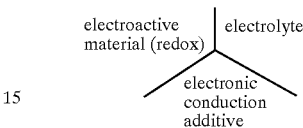

These excessive variations of the mobile ions local concentrations and the gradients within the electroactive materials are extremely prejudicial to the reversibility of the electrode operation over a high number of cycles. These chemical and mechanical constraints or stresses, result at the microscopic level in the disintegration (particulation) of the electroactive material particles, a part of which being susceptible to lose the contact with the carbon particles and thus becoming electrochemically inactive. The material structure can also be destroyed, with the appearance of new phases and eventual release of transition metal derivatives, or other fragments in the electrolyte. These harmful phenomenons appear even more easily the larger the current density or the power requested at the electrode is.

IN THE DRAWINGS

FIG. 1 illustrates the difference between a classic electrode according to the prior art (A) and an electrode according to the invention wherein the electroactive material particles are coated with a carbonaceous coating (B).

FIGS. 2 and 3 illustrate a comparison between a sample of $LiFePO_4$ coated with a carbonaceous deposit, with an uncoated sample. The results were obtained by cyclic voltammetry of $LiFePO_4/POE_{20}LiTFSI/Li$ batteries cycled at 20 mV.h$^{-1}$ between 3 and 3.7 volts at 80° C. The first cycle is shown on FIG. 2, and the fifth on FIG. 3.

Figure 8:
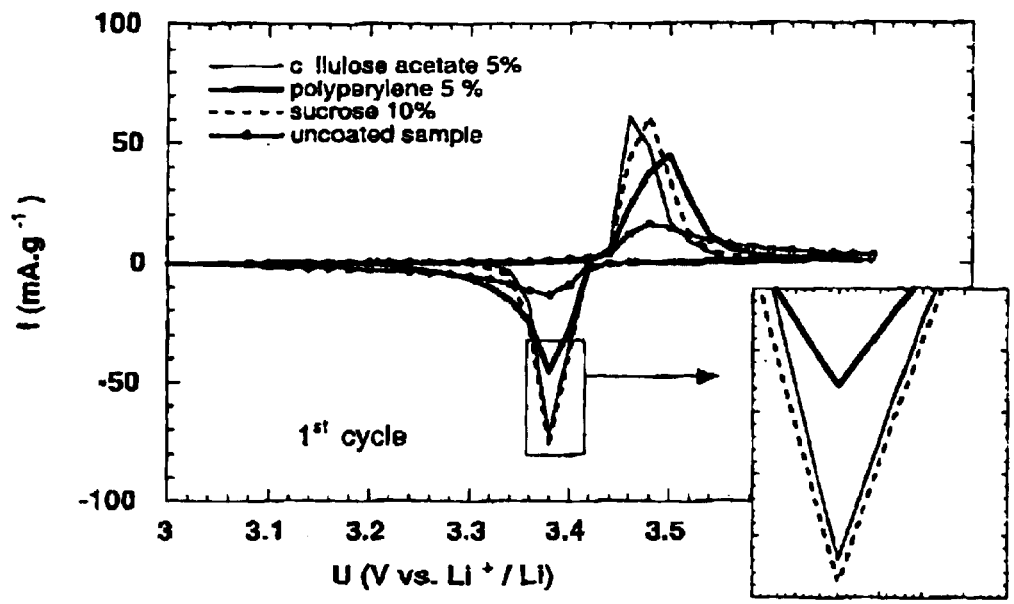
Figure 9:
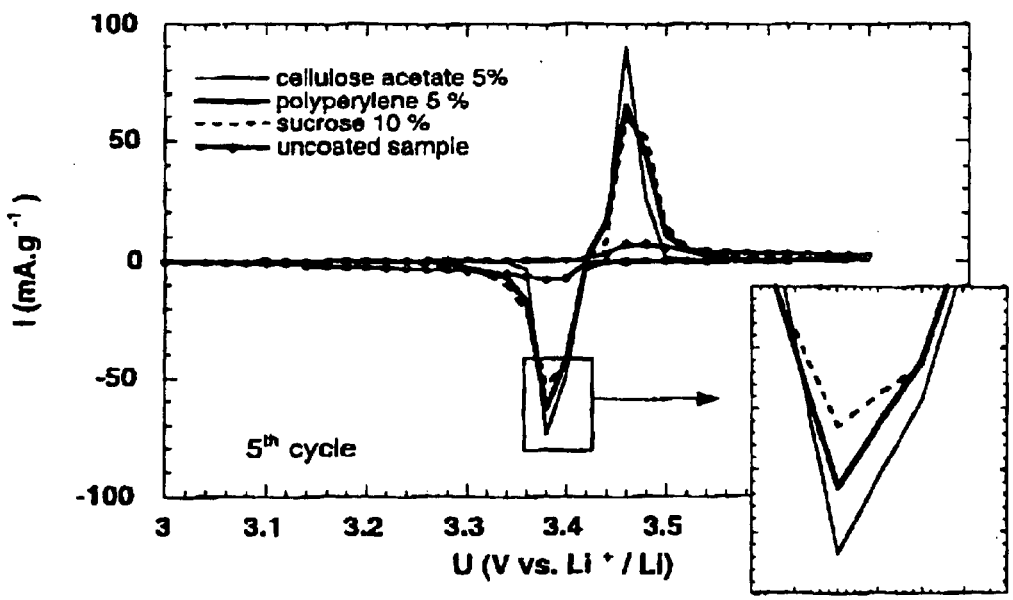

FIGS. 8 and 9 illustrate a comparison between carbonaceous and non-carbonaceous $LiFePO_4$ samples cycled. The results have been obtained by cyclic voltammetry of $LiFePO_4/POE_{20}LiTFSI/Li$ batteries cycled at 20 mV.h$^{-1}$ between 3 and 3.7 volts at 80° C. The first cycle is shown on FIG. 8, and the fifth on FIG. 9.

Figure 10:
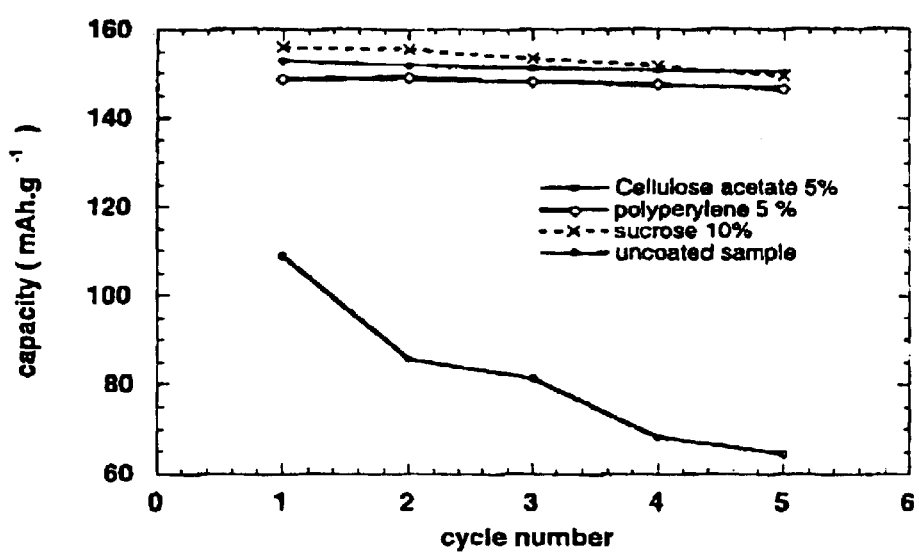

FIG. 10 illustrates the evolution of the capacity during cycling of batteries prepared with carbonaceous and non-carbonaceous $LiFePO_4$ samples.

SUMMARY OF THE INVENTION

In accordance with the present invention, there is provided an electrode material comprising a complex oxide corresponding to the general formula $A_aM_mZ_zO_oN_nF_f$ wherein:

A comprises an alkaline metal;
M comprises at least one transition metal, and optionally at least one non-transition metal such as magnesium or aluminum; and mixtures thereof;
Z comprises at least one non-metal;
O is oxygen; N nitrogen and F is fluorine; and the coefficients a, m, z, o, n, $f \geq 0$ and are selected to ensure electroneutrality, wherein a conductive carbonaceous material is deposited homogeneously on a surface of the material to obtain a substantially regular electric field distribution on the surface of material particles. The similarity in ionic radii between oxygen, fluorine and nitrogen allows mutual replacement of these elements as long as electroneutrality is maintained. For simplicity and considering that oxygen is the most frequently used element, these materials are thereafter referred to as complex oxides. Preferred transition metals comprise iron, manganese, vanadium, titanium, molybdenum, niobium, tungsten, zinc and mixtures thereof. Preferred non-transition metals comprises magnesium and aluminum, and preferred non-metals comprise sulfur, selenium, phosphorous, arsenic, silicon, germanium, boron, and mixtures thereof.

In a preferred embodiment, the final mass concentration of the carbonaceous material varies between 0.1 and 55%, and more preferably between 0.2 and 15%.

In a further preferred embodiment, the complex oxide comprises sulfates, phosphates, silicates, oxysulfates, oxyphosphates, oxysilicates and mixtures thereof, of a transition metal and lithium, and mixtures thereof. It may also be of interest, for structural stability purposes, to replace partially the transition metal with an element having the same ionic radius but not involved in the redox process. For example, magnesium and aluminum, in concentrations preferably varying between 1 and 25%.

The present invention also concerns electrochemical cells wherein at least one electrode is made of an electrode material according to the present invention. The cell can operate as a primary or secondary battery, a supercapacitor, or a light modulating system, the primary or a secondary battery being the preferred mode of operation.

DETAILED DESCRIPTION OF THE INVENTION

The present invention allows the fabrication of electrode materials of extremely varied compositions with its surface, or most of it, coated with a uniform coating of a conductive carbonaceous material deposited chemically. The presence in the electrode materials of the invention of a uniform coating, when compared to a punctual contact obtained with carbon powders or other prior art conductive additives, allows a regular distribution of the electrical field at the surface of the electroactive material particles. Further, the ions concentration gradients are considerably diminished. Such improved distribution of the electrochemical reaction at the surface of the particles allows on one side the maintenance of the structural integrity of the material, and on the other side improves the kinetics in terms of the current density and power availability at the electrode, because of the greater surface accessible.

In the present application, carbonaceous material means a solid polymer comprising mainly carbon, i.e. from 60 to 100% molar, and having an electronic conductivity higher than $10^{-6}$ S/cm at room temperature, preferably higher than $10^{-4}$ S/cm. Other elements that can be present are hydrogen, oxygen, nitrogen, as long as they do not interfere with the chemical inertia of the carbon during the electrochemical operation. The carbonaceous material can be obtained through thermal decomposition or dehydrogenation, e.g., by partial oxidation, of various organic materials. In general, any material leading, through a reaction or a sequence of reactions to the solid carbonaceous material with the desired property without affecting the stability of the complex oxide, is a suitable precursor. Preferred precursors include, but are not limited to: hydrocarbons and their derivatives, especially those comprising polycyclic aromatic moieties, like pitch and tar derivatives, perylene and its derivatives; polyhydric compounds like sugars and carbon hydrates and their derivatives; and polymers. Preferred examples of such polymers include polyolefins, polybutadienes, polyvinylic alcohol, phenol condensation products, including those from a reaction with an aldehyde, polymers derived from furfurylic alcohol, polymers derivatives of styrene, divinylbenzene, naphtalene, perylene, acrylonitrile, vinyl acetate; cellulose, starch and their esters and ethers, and mixtures thereof.

The improvement of the conductivity at the surface of the particles obtained with the carbonaceous material coating according to the present invention allows the satisfactory operations of electrodes containing electroactive materials having an insufficient electronic conductivity to obtain acceptable performances. Complex oxides with redox couples in useful voltage range and/or using elements inexpensive or nontoxic but whose conductivity otherwise would be to low for practical use, now become useful as electrode materials when the conductive coating is present. The choice of the structures or phase mixtures possessing redox properties but having an electronic conductivity that is too low, is thus much wider than that with compounds of the prior art, of the lithium and transition metal mixed oxides. It is particularly possible to include within the redox structures, at least one element selected from non-metals (metalloids) such as sulphur, selenium, phosphorus, arsenic, silicon or germanium, wherein the greater electronegativity allows the modulation of the redox potential of the transition elements, but at the expense of the electronic conductivity. A similar effect is obtained with the partial or complete substitution of the oxygen atoms with fluorine or nitrogen.

The redox materials are described by the general formula $A_aM_mZ_zO_oN_nF_f$ wherein:

A comprises an alkaline metal such as Li, Na, or K;
M comprises at least one transition metal, and optionally at least one a non-transition metal such as magnesium or aluminum; or mixtures thereof;
Z comprises at least one non-metal such as S, Se, P, As, Si, Ge, B;
O is oxygen;
N is nitrogen and F is fluorine, wherein the latter elements can replace oxygen in the complex oxide because of the ionic radii values for $F^-$, $O^{2-}$ and $N^{3-}$ are similar, and
each coefficient a, m, z, o, n and $f \geq 0$ independently, to ensure electroneutrality of the material.

Preferred complex oxides according to the invention comprise those of formula $Li_{1+x}MP_{1-x}Si_xO_4$; $Li_{1+2-y}MP_{1-x}Si_xO_{4-y}F_y$; $Li_{3-x+z}M_2(P_{1-x-z}S_xSi_zO_4)_3$; $Li_{3+y-x+z}V_{2-z-w}Fe_yTi_w(P_{1-x-z}S_xSi_zO_4)_3$, or $Li_{4+x}Ti_5O_{12}$, $Li_{4+x-2y}Mg_yTi_5O_{12}$, wherein $w \leq 2$; $0 \leq x$, $y \leq 1$; $z \leq 1$ and M comprises Fe or Mn.

The carbonaceous coating can be deposited through various techniques that are an integral part of the invention. A preferred method comprises the pyrolysis of organic matter, preferably carbon-rich, in the presence of the redox material. Particularly advantageous are mesomolecules and polymers susceptible of easily forming, either mechanically or by impregnation from a solution or through in situ polymerization, a uniform layer at the surface of the redox material particles. A subsequent pyrolysis or dehydrogenation step thereof provides a fine and uniform layer of the carbonaceous material at the surface of the particles of the redox material. To ensure that the pyrolysis or dehydrogenation reaction will not affect the latter, it is preferred to select compositions wherein the oxygen pressure liberated from the material be sufficiently low to prevent oxidation of the carbon formed by the pyrolysis. The activity of the oxygen of compounds $A_aM_mZ_zO_oN_nF_f$ can be controlled by the concentration of alkaline metal, which itself determines the oxidation state of the transition element or elements contained in the material and being a part of the invention. Of particular interest are the compositions wherein the coefficient "a" of the alkaline metal concentration allows the maintenance of the following oxidation states: $Fe^{2+}$, $Mn^{2+}$, $V^{2+}$, $V^{3+}$, $Ti^{2+}$, $Ti^{3+}$, $Mo^{4+}$, $Nb^{3+}$, $Nb^{4+}$, $W_{4+}$. Generally, oxygen pressures in the order of $10^{-20}$ bars at 0° C. and de $10^{-10}$ bars at 900° C. are sufficiently low to allow the deposition of carbon by pyrolysis, the kinetic of carbon formation in the presence of hydrocarbonaceous residues resulting from the pyrolysis being quicker and less activated than oxygen formation from the redox materials. It is also possible and advantageous to select materials having an oxygen pressure in equilibrium with the materials that is inferior to that of the equilibrium $$C + O_2 \rightleftharpoons CO_2$$

In this instance, the carbonaceous material can be thermodynamically stable vis-à-vis the complex oxide. The corresponding pressures are obtained according to the following equation:

$$\ln P(O_2) = \ln P(CO_2) = \frac{94050}{R(273,2 + \theta)}$$

wherein R is the perfect gas constant (1,987 cal.mole$^{-1}$.K$^{-1}$); and θ is the temperature in ° C.

Table 1 provides oxygen pressures at several temperatures:

| θ (° C.) | P(O$_2$)<br>P(CO$_2$) = 1 atm | P(O$_2$)<br>P(CO$_2$) = 10$^{-5}$ atm |
|---|---|---|
| 200 | 3.5 × 10$^{-44}$ | 3.5 × 10$^{-49}$ |
| 300 | 1.4 × 10$^{-36}$ | 1.4 × 10$^{-41}$ |
| 400 | 2.9 × 10$^{-31}$ | 2.9 × 10$^{-36}$ |
| 500 | 2.5 × 10$^{-27}$ | 2.5 × 10$^{-32}$ |
| 600 | 2.9 × 10$^{-24}$ | 2.5 × 10$^{-29}$ |
| 700 | 7.5 × 10$^{-22}$ | 7.5 × 10$^{-27}$ |
| 800 | 7.0 × 10$^{-20}$ | 7.0 × 10$^{-25}$ |
| 900 | 3.0 × 10$^{-18}$ | 3.0 × 10$^{-23}$ |

It is also possible to perform the carbon deposition through the disproportionation of carbon oxide at temperatures lower than 800° C. according to the equation:

$$2CO \Rightarrow C + CO_2$$

This reaction is exothermic but slow. The complex oxide particles can be contacted with carbon monoxide pure or diluted in an inert gas, at temperatures varying from 100 to 750° C., preferably between 300 and 650° C. Advantageously, the reaction is carried out in a fluidized bed, in order to have a large exchange surface between the gaseous phase and the solid phase. Elements and cations of transition metals present in the complex oxide are catalysts of the disproportionation reaction. It can be interesting to add small amounts of transition metal salts, preferably iron, nickel, or cobalt, at the surface of the particles, these elements being particularly active as catalysts of the disproportionation reaction. In addition to carbon monoxide disproportionation, hydrocarbons in the gaseous forms can be decomposed at moderate to high temper to yield carbon deposits. Of special interest for the operation are the hydrocarbons with a low energy of formation, like alkenes, alkynes or aromatic rings.

In a variation, the deposition of the carbonaceous material can be performed simultaneously with a variation 6foe composition of alkaline metals A. To do so, an organic acid or polyacid salt is mixed with the complex oxide. Another possibility comprises the in situ polymerization of a monomer or monomer mixtures. Through pyrolysis, the compound deposits a carbonaceous material film at the surface and the alkaline metal A is incorporated according to the equation:

$$A_{a'}M_mZ_zO_oN_nF_f + A_{a-a'}C_cO_oR' \Rightarrow A_aM_mZ_zO_oN_nF_f$$

R' being an organic radical, eventually part of a polymeric chain.

Among the compounds susceptible of permitting this reaction, it can be mentioned in a non limited manner salts of carboxylic acids such as oxalic, malonic, succinic, citric, polyacrylic, polymethacrylic, benzoic, phtalic, propiolic, acetylene dicarboxylic, naphthalene di- or tetracarboxylic, perylene tetracarboxylic and diphenic acids.

Obviously, the pyrolysis of an organic material deprived of an alkaline element in combination with an alkaline element salt can also lead to the desired stoichiometry of the complex oxide.

It is also possible to obtain a carbonaceous material deposit, especially at low or mid-range temperatures, lower than 400° C., by reduction of carbon-halogen bonds according to the equation:

$$CY \rightarrow CY + 2e^- \Rightarrow -C = C - + 2Y^-$$

wherein Y represents a halogen or a pseudo-halogen. The tern pseudo-halogen means an organic or inorganic radical susceptible of existing in the form of an ion $Y^{3-}$ and formed a corresponding protonated compound HY. Examples of halogen and pseudo-halogen include F, Cl, Br, I, CN, SCN, CNO, OH, N$_3$, RCO$_2$, RSO$_3$ wherein R is H or an organic radical. The formation by reduction of CY bonds is preferably performed in the presence of reducing elements such as hydrogen, zinc, magnesium, Ti$^{3+}$ ions, Ti$^{2+}$ ions, Sm$^{2+}$ ions, Cr$^{2+}$ ions, V$^{2+}$ ions, tetrakis(dialkylamino ethylene) or phosphines. These reagents can eventually be obtained or regenerated electrochemically. Further, it can also be advantageous to use catalysts increasing the reduction kinetic. Palladium or nickel derivatives are particularly efficient, particularly in the form of complexes with phosphorous or nitrogen compounds like 2,2'-bipyridine. Similarly, these compounds can be generated chemically in an active form in the presence of reducing agents, such as those mentioned above, or electrochemically. Compounds susceptible of generating carbon by reduction include perhalocarbons, particularly in the form of polymers, hexachlorobutadiene and hexachlorcyclopentadiene.

Another way to free carbon from a low temperature process comprises the elimination of the hydrogenated compound HY, Y being as defined above, according to the equation:

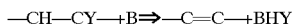

Compounds susceptible of generating carbon from reduction include organic compounds comprising an even number of hydrogen atoms and Y groups, such as hydrohalocarbons, in particular in the form of polymers, such as vinylidene polyfluoride, polychloride or polybromide, or carbon hydrates. The dehydro (pseudo) halogenation can be obtained at low temperature, including room temperature, by reacting a base with the HY compound to form a salt. Example of suitable bases include tertiary basis, amines, amidines, guanidines, imidazoles, inorganic bases such as alkaline hydroxides, organometallic compounds behaving like strong bases, such as $A(N(Si(CH_3)_3)_2$, $LiN[CH(CH_3)_2]_2$, and butyl-lithium.

In the last two methods, it can be advantageous to anneal the material after the carbon deposition. Such treatment improves the structure or the crystallinity of the carbonaceous deposit. The treatment can be performed at a temperature varying between 100 and 1000° C., preferably between 100 and 700° C., to prevent the potential reduction of is the complex oxide by the carbonaceous material.

Generally, it is possible to obtain uniform carbonaceous material coatings, ensuring a sufficient electronic conductivity, i.e. at least on the same order than the ionic conductivity of the oxide particle. The thick coatings provide a conductivity sufficient so that the binary mixture of complex oxide particles coated with the carbonaceous material, and the electrolyte, liquid or polymeric or the inert macromolecular binder to be wetted with the electrolyte, is conductive by a simple contact between the particles. Generally, such behaviour can be observed at volumic fractions comprised between 10 and 70%.

It can also be advantageous to select deposits of carbonaceous materials sufficiently thin to prevent obstruction of the passage of ions, while ensuring the distribution of the electrochemical potential at the surface of the particles. In this instance, the binary mixtures eventually do not possess an electronic conductivity sufficient to ensure the electronic exchanges with the electrode substrate (current collector). The addition of a third electronic conductive component, in the form of a fine powder or fibers, provides satisfactory macroscopic conductivity and improves the electronic exchanges with the electrode substrate. Carbon blacks or carbon fibers are particularly advantageous for this purpose and give satisfactory results at volumic concentrations that have little or no effect on the rheology during the use of the electrode because of the existence of electronic conductivity at the surface of the electrode material particles. Volumic fractions of 0.5 to 10% are particularly preferred. Carbon black such as Shawinigan® or Ketjenblack® are preferred. Among carbon fibers, those obtained by pyrolysis of polymers such as tar, pitch, polyacrylonitrile as well as those obtained by cracking of hydrocarbons are preferred.

Interestingly, because of its light weight and malleability, aluminium is used as the current collector constituent. This metal is nonetheless coated with an insulating oxide layer. This layer, which protects the metal from corrosion, can in certain conditions increase the thickness, leading to an increase resistance of the interface, prejudicial to the good operation of the electrochemical cell. This phenomenon can be particularly detrimental and fast when the electronic conductivity is only ensured, as in the prior art, by the carbon particles having a limited number of contact points. The use, in combination with aluminium, of electrode materials coated with a conductive carbonaceous material layer increases the exchange surface aluminium-electrode. The aluminum corrosion effects are therefore cancelled or at least significantly minimized. It is possible to use either aluminium collectors in the form of sheet or eventually in the form of expanded or perforated metal or fibers, which allow a weight gain. Because of the properties of the materials of the invention, even in the case of expended or perforated metal, electronic exchanges at the collector level take place without noticeable increase of the resistance.

Whenever the current collectors are thermally stable, it is also possible to perform the pyrolysis or dehydrogenation directly on the collector, to obtain after carbon deposition, a continuous porous film that can be infiltrated with an ionic conductive liquid, or with a monomer or a mixture of monomers generating a polymer electrolyte after in situ polymerisation. The formation of porous films in which the carbonaceous coating forms a chain are easily obtained according to the invention through pyrolysis of a complex oxide-polymer composite deposited in the form of a film on a metallic substrate.

In using the electrode material according to the invention into an electrochemical cell, preferably a primary or secondary battery, the electrolyte is preferably a polymer, solvating or not, optionally plasticized or gelled by a polar liquid comprising in solution one or more metallic salts, preferably at least a lithium salt. In such instance, the polymer is preferably formed from units of oxyethylene, oxypropylene, acrylonitrile, vinylidene fluoride, acrylic acid or methacrylic acid esters, itaconic acid esters with alkyls or oxaalkyl groups. The electrolyte can also be a polar liquid immobilized in a microporous separator, such as a polyolefin, a polyester, nanoparticles of silica, alumina or lithium aluminate $LiAlO_2$. Examples of polar liquids include cyclic or linear carbonates, alkyl formiates, oligoethylene glycols, α-ω alkylethers, N-methylpyrrolidinone, γ-butyrolactone, tetraalakylsulfamides and mixtures thereof.

The following examples are provided to illustrate preferred embodiment of the invention, and shall not be construed as limiting its scope.

EXAMPLE 1

This example illustrates the synthesis of a material of the present invention leading directly to an insertion material coated with a carbonaceous deposit.

The material $LiFePO_4$ coated with a carbonaceous deposit is prepared from vivianite $Fe_3(PO_4)_2.8H_2O$ and lithium orthophosphate $Li_3PO_4$ in stoichiometric amounts according to the reaction:

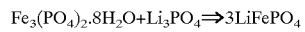

Polypropylene powder in an amount corresponding to 3% by weight of vivianite is added. The three components mixed together intimately and ground in a zirconia ball mill. The mixture is then heated under an inert atmosphere of argon, firstly at 350° C. for 3 hours to dehydrate the vivianite. Subsequently, the temperature is risen gradually up to 700° C. to crystallize the material and carbonize the polypropylene. The temperature is maintained at 700° C. for 7 hours. The structure of the material obtained, as verified by X-rays, corresponds to that published for triphyllite. The amount of carbon present in the sample has been determined by elemental analysis, and gave a concentration of 0.56%. For comparison purposes, a similar sample has been prepared in similar conditions, but without the addition of polypropylene powder. This latter sample also shows a pure crystalline structure of the type $LiFePO_4$.

Electrochemical Properties

The materials prepared were tested in button batteries of the CR2032 type at room temperature and 80° C.

Tests at 80° C. (Polymer Electrolyte)

The materials obtained above have been tested in button batteries of the CR2032 type. The cathode were obtained by mixing together the active material powder with carbon black (Ketjenblack®) to ensure the electronic exchange with the current collector, and polyethylene oxide with a molecular weight of 400 000 is added as both a binder and an ionic conductor. The proportions, by weight, are 35:9:56. Acetonitrile is added to the mixture to dissolve the ethylene polyoxide. The mixture is homogenized and poured on a stainless steel disc of 1.7 cm². The cathode is dried under vacuum, and transferred in a Vacuum Atmospheres glove box, under helium atmosphere (<1 vpm $H_2O$, $O_2$). A sheet of lithium (27 μm) laminated on a nickel substrate is used as the anode. The polymer electrolyte comprises polyethylene oxide of weight 5 000 000 and LiTFSI (lithium bistrifluoromethanesulfonimide) in proportions of oxygen of oxyethylene units/lithium of 20:1.

The electrochemical experiments were carried out at 80° C., temperature at which the ionic conductivity of the electrolyte is sufficient ($2 \times 10^{-3}$ Scm$^{-1}$). The electrochemical studies are performed by slow voltammetry (20 mV.h$^{-1}$) controlled by a battery cycler of the Macpile® type. The batteries were charged and discharged between 3.7 and 3 V.

Figure 3:
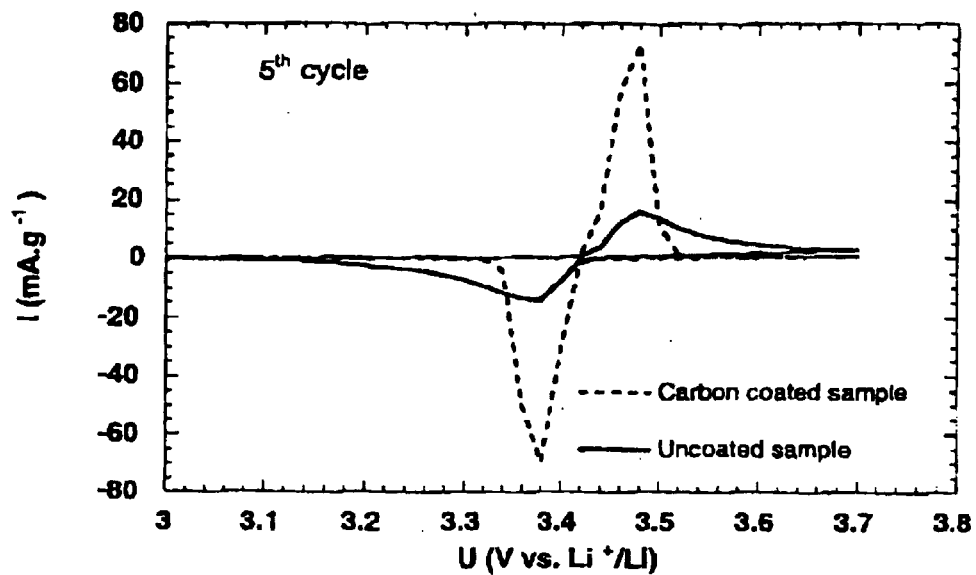
Figure 4:
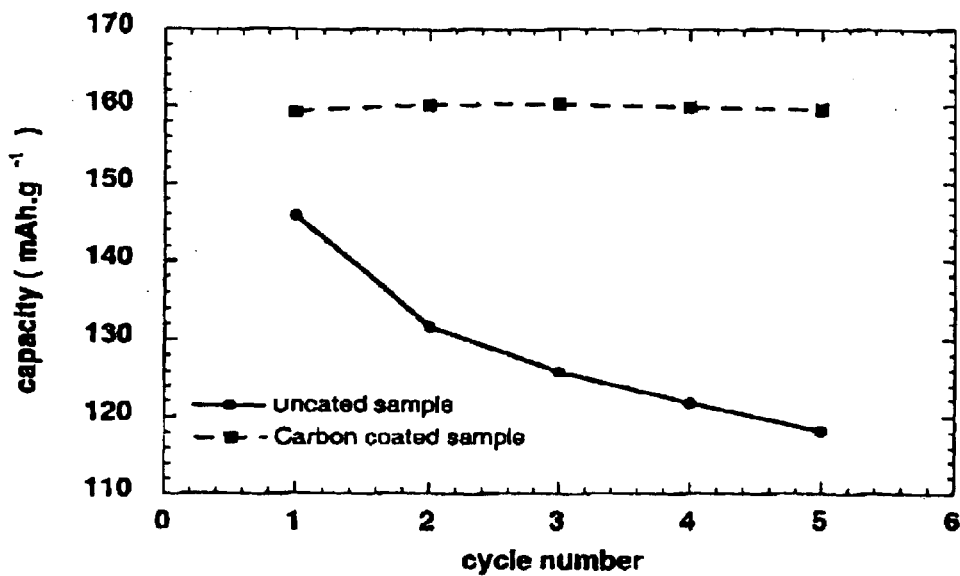
FIG. 4 illustrates the evolution of capacity during cycling for batteries containing carbonaceous and non-carbonaceous $LiFePO_4$ samples.

FIG. 2 illustrates the first cycle obtained for carbonaceous and non-carbonaceous materials prepared above. For the non-carbonaceous sample, the oxidation and reduction phenomenons extend trail over a wide potential range. For the carbonaceous sample, the peaks are much better defined on a narrow potential domain. The evolution of both materials during the first 5 cycles is very different FIG. 3). For the carbon-coated sample, die oxidation and reduction kinetics become faster and faster, thus leading to better defined peaks (larger peak currents and narrower peak widths). However, for the non-carbonaceous sample, the kinetics become slower and slower. The evolution of the capacity of both samples is illustrated in FIG. 4. For the carbonaceous sample, the capacity exchanged is stable. It represents from 94 to 100% of the theoretical capacity (170 mAh.g$^{-1}$) depending on the sample. The initial capacity of the non-carbonaceous material is around 145 mAh.g$^{-1}$, i.e., about 85% of the theoretical capacity. For this sample, the capacity exchanged quickly decreases. After 5 cycles, the battery has lost 20% of its initial capacity.

Figure 5:
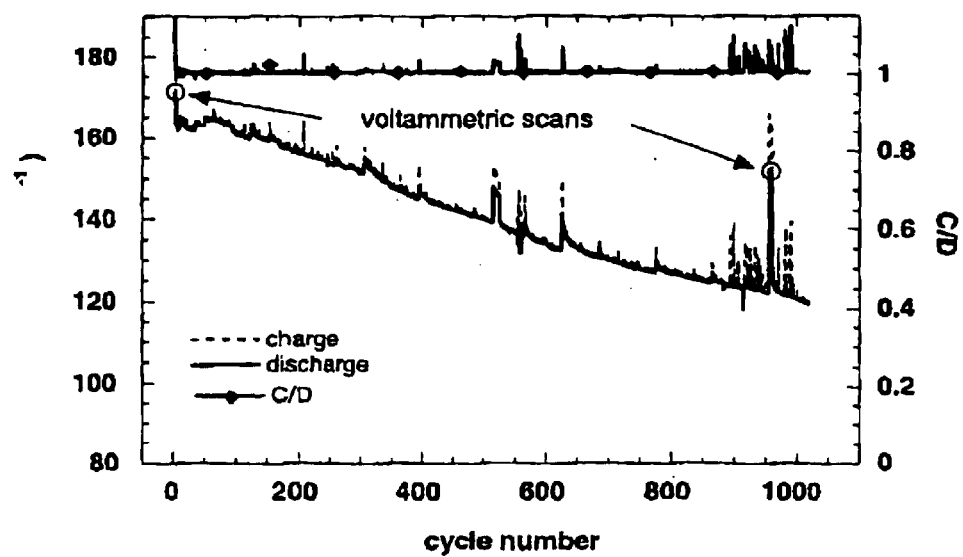
FIG. 5 illustrates the performances of a battery containing carbonaceous $LiFePO_4$ and cycled under an intentiostatic mode between 3 and 3.8 V at 80° C. with a charge and discharge speed corresponding to C/1.

The carbonaceous sample is cycled under an intentiostatic mode between 38 and 3 V with fast charging and discharging rates. The imposed currents correspond to a C/1 rate, which means that all the capacity is exchanged in 1 hour. These cycling results are shown in FIG. 5. The first 5 cycles are performed under a voltamperometric mode to activate the cathode and determine its capacity. In this instance, 100% of the theoretical capacity is exchanged during the first voltammetric cycles and 96% during the first 80 intentiostatic cycles. Subsequently, the capacity slowly decreases, and after 1000 cycles, 70% of the capacity (120 mAh.g$^{-1}$) is still exchanged at this rate. The cycling in the potentiodynamic mode performed after 950 cycles show that in reality, 89% of the initial capacity is still available at slower discharges rates. The loss of power is associated with the increase of the resistance at the lithium/polymer electrolyte interface. The parameter (capacity passed during charging)/(capacity passed during discharging) become erratic in appearance. This parameter C/D, shown on FIG. 5 at the end of cycling, leads to the presumption that dendrites are formed.

Tests at Room Temperature (Liquid Electrolyte)

Figure 6:
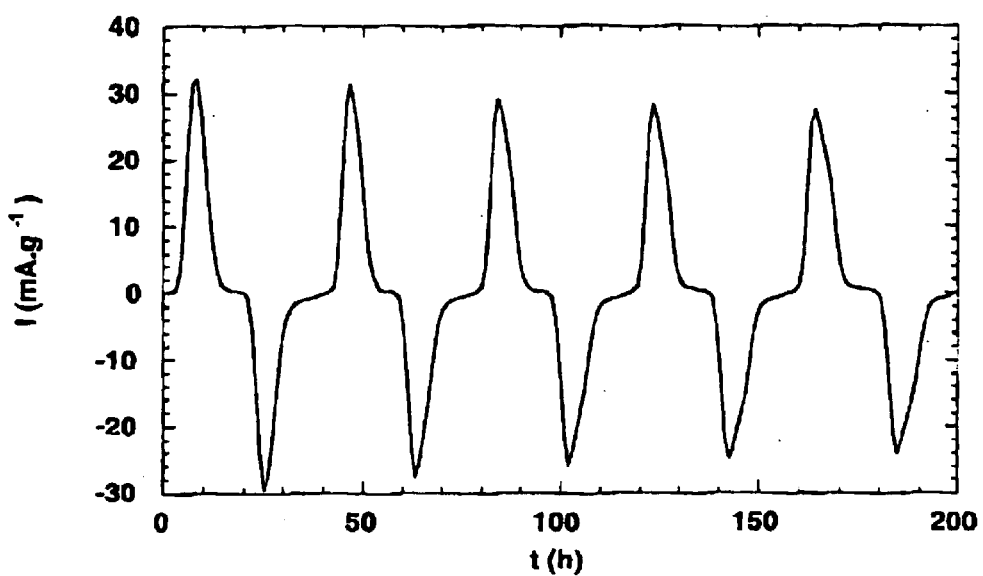
FIG. 6 illustrates the evolution of the current vs. time of a $LiFePO_4$/gamma-butyrolactone LiTFSI/Li containing a carbonaceous sample and cycled at 20 mV.h$^{-1}$ between 3 and 3.7 V at room temperature.
Figure 7:
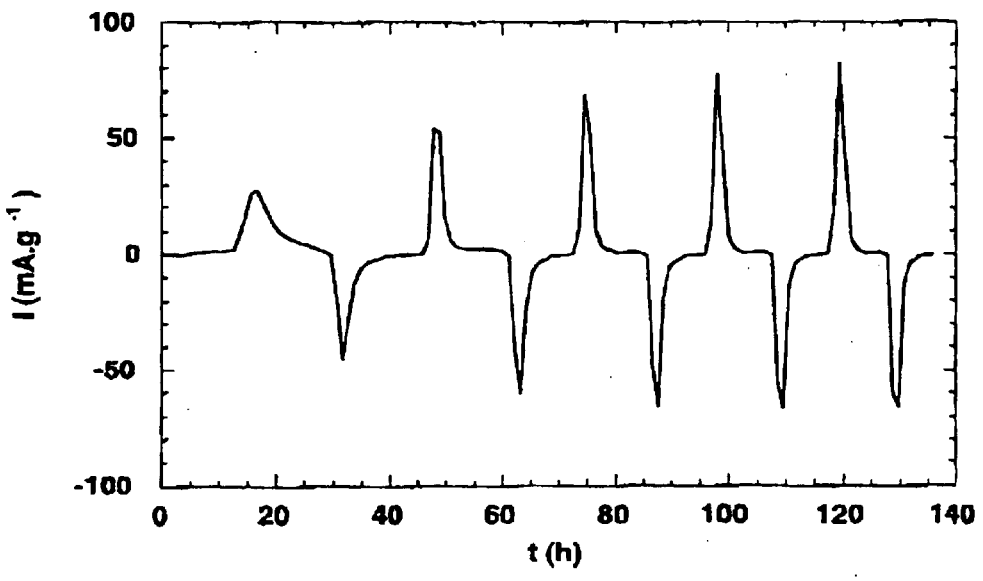
FIG. 7 illustrates the evolution of the current vs. time of a $LiFePO_4/POE_{20}LiTFSI/Li$ containing a carbonaceous sample.

The $LiFePO_4$ coated with a carbonaceous deposit was also tested at room temperature. In this instance, the composite cathode is prepared by mixing the active material with carbon black and EPDM (preferably dissolved in cyclohexane) in ratio 85:5:10. The mixture is spread onto a stainless steel current collector in the form of a disc of 1.7 cm², dried under vacuum, and kept in a glove box under helium atmosphere. As above, lithium is used as the anode. Both electrodes are separated by a Celgard™ porous membrane. The electrolyte used in a LiTFSI 0.8 molal solution in gamma-butyrolactone. The voltamperograms illustrated in FIG. 6 were obtained at room temperature under is slow voltammetry (20 mV.h$^{-1}$) between 3 and 3.8 V. With such configuration, the oxidation and reduction kinetics appears to be much slower than at 80° C. Further, the power of the battery decreases slowly during cycling. On the other hand, the entire theoretical capacity is accessible (97.5% cycle 1, 99.4% cycle 5), i.e., reversibly exchanged without loss during cycling (5 cycles). It is not excluded that the low power of this battery may come from a poor permeation of the electrode by the electrolyte, the latter being a poor wetting agent for the binding polymer.

The example illustrates that the improvement of the material studied, because of the presence of the carbonaceous deposit at the surface of the particles, is reflected on the kinetics, the capacity and the cyclability. Further, its role is independent from that of the type of carbon black added during the preparation of composite cathodes.

EXAMPLE 2

This example shows the formation of a conductive carbonaceous deposit from a hydrocarbon gas. The synthesis described in Example 1 for the preparation of lithium iron phosphate is repeated without adding polypropylene powder, and by replacing the thermal treatment inert atmosphere with a mixture of 1% propene in nitrogen. During the thermal treatment, propene decomposes to form a carbon deposit on the material being synthesized. The resulting sample obtained contains 2.5% of carbon, as determined by chemical analysis. Cyclic voltammetry is performed on this sample under the conditions described in Example 1 de carbon, and shows the important activation phenomenon during the first cycles (see FIG. 6). The improvement in redox kinetics is accompanied in this instance by an increase of the capacity reversibly exchanged. As measured during the discharge step, the initial capacity of the LiFePO, sample prepared represents 77% of the theoretical capacity, taking into account the 2.5% electrochemically inactive carbon. After 5 cycles, the capacity reaches 91.4%. The activation phenomenon observed is linked to the thickness of the carbon layer eventually porous coating the particles and capable of slowing the diffusion of the cations.

The following examples 3–5 illustrate the treatment of the complex oxide, namely the lithium iron phosphate $LiFePO_4$, prepared thermally and independently in order to obtain a conductive carbonaceous coating.

EXAMPLE 3

The tryphilite sample $LiFePO_4$ prepared above is analyzed. Its mass composition is: Fe: 34.6, Li: 4.2%, P: 19.2, which represents a 5% difference with respect to the stoichiometry.

The powder to be treated is impregnated with an aqueous solution of commercial sucrose, and dried. The amount of solution is selected to correspond to 10% of the weight of sucrose with respect to the weight of the material to be treated. Water is completely evaporated under agitation to obtain a homogeneous distribution. The use of sugar represents a preferred embodiment because it melts before being carbonized, thereby provided a good coating of the particles. Its relatively low carbon yield after pyrolysis is compensated by its low cost.

The thermal treatments are performed at 700° C. under argon atmosphere. The temperature is maintained for 3 hours. Elemental analysis shows that this product contains 1.3% by weight of carbon Such thermal treatment leads to a black powder giving an electronic conductivity measurable with a simple commercial ohm-meter. Its electroactivity, as measured on the $1^{rst}$ (FIG. 8) and $5^{th}$ (FIG. 9) charge-discharge cycle, is 155.9 mAhg$^{-1}$ and 149.8 mAhg$^{-1}$ respectively, which is 91.7% and 88.1% of the theoretical value. These values are to be compared with that of the product not coated with the carbon deposit, that has only 64% electroactivity. After 5 cycles, this value fades to 37.9% (FIG. 10).

EXAMPLE 4

Cellulose acetate is added to the phosphate LiFePO$_4$ of Example 3 as a precursor of the carbon coating. This polymer is known to decompose with high carbonization yields, on the order of 24%. It decomposes between 200 and 400° C. Above this temperature, the amorphous carbon rearranges to give a graphite-type structure that favors coherent and highly conductive carbon deposits.

Cellulose acetate is dissolved in acetone in a ratio corresponding to 5% by weight of the material to be treated, and dried before proceeding as above. The carbon concentration of the final product is 1.5%. The thermal treatment leads, in a similar manner, to a black powder having surface electronic conductivity. Its electroactivity, as measured on the $1^{rst}$ (FIG. 8) and $5^{th}$ (FIG. 9) charge-discharge cycles, is 152.6 mAhg$^{-1}$ and 150.2 mAhg$^{-1}$ respectively, which is 89.8% and 88.3% of the theoretical value. This value is to be compared with that of the product not coated with the carbon deposit, that has only 64% electroactivity. After 5 cycles, this value fades to 37.9% (FIG. 10).

EXAMPLE 5

Perylene and its derivatives are known to lead, after pyrolysis, to graphitic-type carbons, because of the existence of condensed cycles in the starting molecule. In particular, the perylene-tetracarboxylic acid anhydride decomposes above 560° C. and provides very coating carbon coatings. However, this product shows a poor solubility, and their intimate mixture with the complex oxide, here also LiFePO$_4$ of Example 3, is difficult to embody. To solve this problem, a polymer containing perylene groups separated with an ethylene polyoxide chain has been prepared in a first step. The oxyethylene segments are selected to be sufficiently long to act as solubilizing agents for the aromatic groups in the usual organic solvents. Therefore, commercial 3,4,9,10-perylenetetracarboxylic acid anhydride (Aldrich) is reacted with Jeffamine 600 (Hunstmann) at high temperature, according to the following reaction:

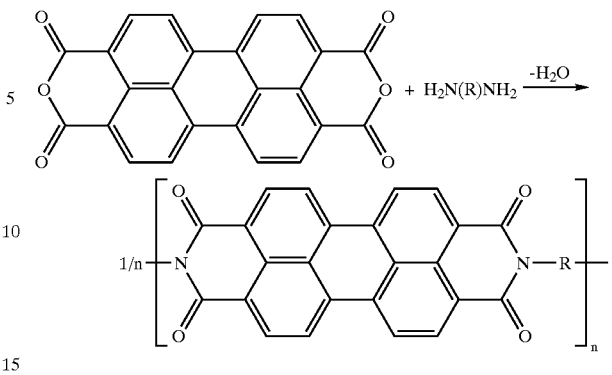

wherein R=—[CH(CH$_3$)CH$_2$O—]$_p$(CH$_2$CH$_2$O—)$_q$[CH$_2$—CH(CH)$_3$O]$_{p-1}$CH$_2$—CH(CH)$_3$–1$\leq$p$\leq$2; 10$\leq$n$\leq$14

The synthesis is completed within 48 hours in dimethylacetamide under reflux (166° C.). The polymer formed is precipitated in water, and a solid-liquid separation is carried out. It is purified by dissolution in acetone, followed by re-precipitation in ether. The process allows the removal of unreacted starting materials, as well as low mass products. The powder is finally dried.

Carbonization yield of this product is of the order of 20%. The polymer is dissolved in dichloromethane in a ratio corresponding to 5% of the weight of the material to be treated before proceeding as described above in Examples 3 and 4. The carbon content of the final product is 1%. The thermal treatment leads, as described above, to a black conductive powder. Its electroactivity, as measured on the $1^{rst}$ (FIG. 8) and $5^{th}$ (FIG. 9) charge-discharge cycles, is 148.6 mAhg$^{-1}$ and 146.9 mAhg$^{-1}$ respectively, which is 87.4% and 86.4% of the theoretical value. This value is to be compared with that of the product not coated with the carbon deposit, that has only 64% electroactivity. After 5 cycles, this value fades to 37.9% (FIG. 10).

EXAMPLE 6

This example illustrates the use of an elimination reaction from a polymer to form a carbonaceous deposit according of the invention.

Ferric iron sulfate Fe$_2$(SO$_4$)$_3$ with a "Nasicon" orthorhombic structure was obtained from commercial hydrated iron (III) sulfate (Aldrich) by dehydration at 450° C. under vacuum. With cooling, and under stirring, the powder suspended in hexane was lithiated with stoichiometric 2M butyl lithium to reach the composition Li$_{1.5}$Fe$_2$(SO$_4$)$_3$. 20 g of the resulting off-white powder were slurried in 100 ml acetone and 2.2 gram of poly(vinylidene bromide) (—CH$_2$CBr$_2$)$_n$— were added and the mixture was treated for 12 hours in a ball mill with alumina balls. The suspension thus obtained was dried in a rotary evaporator and crushed as coarse powder in a mortar. The solid was treated with 3 g of diazabicyclo [5.4.0]unde-7-cene (DBU) in acetonitrile under reflux for three hours. The black powder thus obtained was filtered to eliminate the resulting amine bromide and is excess reagent, rinsed with acetonitrile and dried under vacuum at 60° C. Further annealing of the carbonaceous deposit was performed under oxygen-free argon (<1 ppm) at 400° for three hours.

The material coated with the carbonaceous material was tested for electrochemical activity in a lithium cell with a lithium metal electrode, 1 molar lithium bis-(trifluoromethanesulfonimide) in 50:50 ethylene carbonatedimethoxyethane mixture as electrolyte immobilized in a 25 82 m microporous polypropylene separator. The cathode was obtained from the prepared redox material mixed with Ketjenblack™ and slurried in a solution of ethylene-propylene-diene polymer (Aldrich), the ratio of solids content being 85:10:5. The cathode mix was spread on an expanded aluminium metal grid and pressed at 1 ton cm$^{-2}$ to a resulting thickness of 230 µm. The button cell assembly was charged (the tested material being the anode) at 1 mAcm$^{-2}$ between the cut-off potentials of 2.8 and 3.9 volts. The material capacity is 120 mAhg$^{-1}$, corresponding to 89% of theoretical value. The average potential was obtained at 3.6 V vs. Li$^+$:Li$^\circ$.

EXAMPLE 7

This example illustrates the use of a nitrogen-containing compound as electrode material.

Powdered manganous oxide MnO and lithium nitride, both commercial (Aldrich) were mixed in a dry box under helium in a 1:1 molar ratio. The reactants were put in a glassy carbon crucible and treated under oxygen free nitrogen (<1 vpm) at 800° C. 12 g of the resulting oxynitride with an antifluorite structure Li$_3$MnNO were added to 0.7 g of micrometer size polyethylene powder and ball-milled under helium in a polyethylene jar with dry heptane as dispersing agent and 20 mg of Brij™ 35 (ICI) as surfactant. The filtered mix was then treated under a flow of oxygen-free nitrogen in a furnace at 750° C. to ensure decomposition of the polyethylene into carbon.

The carbon-coated electrode material appears as a black powder rapidly hydrolyzed in moist air. All subsequent handling was carried out in a dry box wherein a cell similar to that of Example 6 was constructed and tested for electrochemical activity of tie prepared material. The electrolyte in this case is a mixture of commercial tetraethylsulfamide (Fluka) and dioxolane in a 40:60 volume ratio. Both solvents were purified by distillation over sodium hydride (under 10 torrs reduced pressure for the sulfamide). To the solvent mixture, is added lithium bis-(trifluoromethanesulfonimide) (LiTFSI) to form a 0.85 molar solution. Similarly to the set-up of Example 6, the cell comprises a lithium metal electrode, the electrolyte immobilized in a 25 µm porous polypropylene separator and the material processed in a way similar to that of Example 6.

The cathode is obtained from the prepared redox material mixed with Ketjenblack™ and slurried in a solution of ethylene-propylene-diene polymer, the ratio of solids content being 90:5:5. The cathode mix is pressed on an expanded copper metal grid at 1 ton cm$^{-2}$ with a resulting thickness of 125 µm. The button cell assembly is charged at 0.5 mAcm$^{-2}$ (the oxynitride being the anode) between the cut-off potentials of 0–9 and 1.8 volts. The materials capacity was 370 mAhg$^{-1}$, i.e., 70% of the theoretical value for two electrons per formula unit. The average potential is found at 1.1 V vs. Li$^+$:Li$^\circ$. The material is suited for use as negative electrode material in lithium-ion type batteries. An experimental cell of this type has been constructed with the electrode material on a copper metal grid similar to that tested previously and a positive electrode material obtained by chemical delithiation of the lithium iron phosphate of Example 1 by bromine in acetonitrile. The iron (no) phosphate obtained was pressed onto an aluminium grid to form the positive electrode and the 0.85 M LiTFSI tetraethylsulfamide/dioxolane solution used as electrolyte. The average voltage of such cell is 2.1 volts and its energy density, based on the weight of the active materials, is 240 Wh/Kg

EXAMPLE 8

Lithium vanadium (III) phosphosilicate Li$_{3.5}$V$_2$(PO$_4$)$_{2.5}$(SiO$_4$)$_{0.5}$, having a "Nasicon" structure was prepared in the following manner:

Lithium carbonate (13.85 g), lithium silicate Li$_2$SiO$_3$ (6.74 g), dihydrogen ammonium phosphate (43.2 g) and ammonium vanadate (35.1 g) were mixed with 250 mL of ethylmethylketone and treated in a ball mill with alumina balls in a thick-walled polyethylene jar for 3 days. The resulting slurry was filtered, dried and treated in a tubular furnace under a 10% hydrogen in nitrogen gas flow at 600° C. for 12 hours. After cooling, 10 g of the resulting powder were introduced in a planetary ball mill with tungsten carbide balls. The resulting powder was added to a solution of the polyaromatic polymer prepared in Example 5 (polyoxyethylene-co-perylenetetracarboxylicdimide 0.8 g in 5 mL acetone), well homogenized, and the solvent was evaporated.

The red-brown powder was thermolyzed in a stream of oxygen-free argon at 700° C. for 2 hours, leaving after cooling a black powder with a measurable surface conductivity. The material coated with the carbonaceous material was tested for electrochemical activity in a lithium-ion cell with a natural graphite electrode (NG7) coated on a copper current collector and corresponding to 24 mg/cm$^2$, 1 molar lithium hexafluorophosphate in 50:50 ethylene carbonate dimethylcarbonate mixture as electrolyte immobilized in a 25 µm microporous polypropylene separator. The cathode was obtained from the lithium vanadium phosphosilicate mixed with Ketjenblackk™ and slurried in a solution of vinylidenefluoride-hexafluoropropene copolymer in acetone, the ratio of solids content being 85:10:5. The cathode mix was spread on an expanded aluminium metal grid and pressed at 1 ton cm$^{-2}$ to a resulting thickness of 190 µm corresponding to a active material loading of 35 mg/cm$^2$. The button cell assembly was charged (the tested material being the anode) at 1 mAcm$^{-2}$ between the cut-off potentials of 0 and 4.1 volts. The capacity of the carbon coated material was 184 mAhg$^1$, corresponding to 78% of the theoretical value (3.5 lithium per unit formula), with a slow fading with cycling. In a comparative test, a similar cell constructed using instead the uncoated material, as obtained after milling the heat treated inorganic precursor but omitting the addition of the perylene polymer, shows a capacity of 105 mAhg$^{-1}$, rapidly fading with cycling.

EXAMPLE 9

This example illustrates the formation of a carbonaceous coating simultaneous to a variation of the alkali metal content of the redox material.

13.54 g of commercial iron (III) fluoride (Aldrich), 1.8 g of the lithium salt of hexa-2,4-dyine dicarboxylic acid are ball milled in a thick-walled polyethylene jar with alumina balls, in the presence of 100 mL of acetonitrile. After 12 hours, the resulting slurry was filtered and the dried powder is treated under a stream of dry, oxygen-free nitrogen in a tubular furnace at 700° C. for three hours. The resulting black powder contained from elemental analysis Fe: 47%, F: 46%, Li: 1.18%, C: 3.5%, corresponding to the formula Li$_{0.2}$FeF$_3$C$_{0.35}$. The electrode material was tested for its capacity in a cell similar to that of Example 6 with the difference that the cell is first tested on discharge (the electrode material as cathode), and then recharged. The cut-off voltages were chosen between 2.8 and 3.7.Volts. The experimental capacity on the first cycle was 190 mAhg$^{-1}$, corresponding to 83% of the theoretical value. For comparison, a cell with $FeF_3$ as the electrode material and no carbonaceous coating has a theoretical capacity of 246 $mAhg^{-1}$. In practice, the first discharge cycle obtained in similar conditions to the material of the invention is 137 $mAhg^{-1}$.

EXAMPLE 10

This example illustrates also the formation of a carbonaceous coating simultaneous to a variation of the alkali metal content of the redox material.

Commercial polyacrylic acid of molecular weight 15 000 was dissolved as 10% solution in water/methanol mixture and titrated with lithium hydroxide to a pH of 7. 4 μL of this solution were dried in the crucible of a thermogravimetry air a 80° C. to evaporate the water/methanol. The heating was then continued to 500° C., showing a residue of 0.1895 mg of calcination residue as lithium carbonate.

18.68 g of commercial iron (III) phosphate dihydrate, (Aldrich), 8.15 g lithium oxalate (Aldrich), 39 mL of the lithium polyacrylate solution, 80 mL of acetone and 40 mL of 2,2-dimethoxy acetone as water scavenger were ball milled in a thick-walled polyethylene jar with alumina balls. After 24 hours, the resulting slurry was filtered and dried. The resulting powder was treated under a stream of dry, oxygen-force nitrogen in a tubular furnace at 700° C. for three hours, resulting in a blackish powder. The resulting product had the following elemental analysis: Fe: 34%, P: 18.8%, Li: 4.4%, C: 3.2%. The X-ray analysis confirmed the existence of pure triphilite $LiFePO_4$ as the sole crystalline component. The electrode material was tested for its capacity in a cell similar to that of Example 1 with a PEO electrolyte, and then recharged. The cut-off voltages were chosen between 2.8 and 3.7 V. The experimental capacity on the first cycle was 135 $mAhg^{-1}$, corresponding to 77% of the theoretical value, increasing to 156 $mAhg^{-1}$ (89%) while the peak definition improved with further cycling. 80% of this capacity is accessible in the potential range 3.3–3.6 V vs. $Li^+:Li°$.

EXAMPLE 11

The compound $LiC_{0.75}Mn_{0.25}PO_4$ was prepared from intimately ground cobalt oxalate dihydrate, manganese oxalate dihydrate and dihydrogen ammonium phosphate by firing in air at 850° C. for 10 hours. The resulting mauve powder was ball milled in a planetary mill with tungsten carbide balls to an average grain size of 4 μm. 10 g of this complex phosphate were triturated in a mortar with a 10 mL of 6% solution of the perylene polymer of Example 5 in methyl formate. The solvent rapidly evaporated. The resulting powder was treated under a stream of dry, oxygen-free argon in a tubular furnace at 740° C. for three hours, resulting in a black powder. The electrochemical activity of the cell was tested in a lithium-ion cell similar to that of Example 6. The electrolyte was in this case lithium bis-fluoromethanesulfonimide ($Li[FSO_2]_2N$) dissolved at a concentration of 1M in the oxidation-resistant solvent dimethylamino-trifluoroethyl sulfamate $CF_3CH_2OSO_2N(CH_3)_2$. When initially charged, the cell showed a capacity of 145 $mAhg^{-1}$ in the voltage window 4.2–4.95 V vs. $Li^+:Li°$. The battery could be cycled for 50 deep charge-discharge cycles with less than 10% decline in capacity, showing the resistance of the electrolyte to high potentials.

EXAMPLE 12

The compound $Li_2MnSiO_4$ was prepared by calcining the gel resulting from the action of a stoichiometric mixture of lithium acetate dihydrate, manganese acetate tetrahydrate and tetraethoxysilane in a 80:20 ethanol water mixture. The gel was dried in an oven at 80° C. for 48 hours, powdered and calcined under air at 800° C. 3.28 g of the resulting silicate and 12.62 g of lithium iron phosphate from Example 3 were ball milled in a planetary mill similar to that of Example 11, and the powder was treated at 800° C. under a stream of dry, oxygen-free argon in a tubular furnace at 740° C. for 6 hours. The complex oxide obtained after cooling has the formula $Li_{1.2}Fe_{0.8}Mn_{0.2}P_{0.8}Si_{0.2}O_4$. The powder was moistened with 3 mL of a 2% solution of cobalt acetate, then dried. The powder was treated in the same tubular furnace at 500° C. under a flow of 1 mL/s of 10% carbon monoxide in nitrogen for two hours. After cooling, the resulting black powder was tested for electrochemical activity in conditions similar to those of Example 1. With a PEO electrolyte at 80° C., the capacity was measured from the cyclic voltamogram curve at 185 $mAhg^{-1}$ (88% of theory) between the cut-off voltages of 2.8 and 3.9 V vs. $Li^+:Li°$. The uncoated material tested in similar condition has a specific capacity of 105 $mAhg^{-1}$.

EXAMPLE 13

Under argon, 3 g of lithium iron phosphate from Example 3 was suspended in 50 mL acetonitrile to which was added 0.5 g of hexachlorocyclopentadiene and 10 mg of tetrakis (triphenylphosphine)nickel (0). Under vigorous stirring, was added dropwise 1.4 mL of tetrakis(dimethylamino)ethylene at room temperature. The solution turned blue, and after more reducing agent has been added, black. The reaction was left under stirring for 24 hours after completion of the addition. The resulting black precipitate was filtered, washed with ethanol and dried under vacuum. Annealing of the carbon deposit was performed at 400° C. under a flow of oxygen free gas for 3 hours. The resulting black powder was tested for electrochemical activity in conditions similar to those of Example 1. The measured capacity between the cut-off voltages of 2.9 and 3.7 V vs. $Li^+:Li°$ was found experimentally at 160 $mAhg^{-1}$ (91% of theory). The uncoated material has a specific capacity of 112 $mAhg^{-1}$ in the same experimental conditions.

EXAMPLE 14

The spinel compounds $Li_{3.5}Mg_{0.5}Ti_4O_{12}$ was prepared by sol-gel technique using titanium tetra(isopropoxide) (28.42 g), lithium acetate dihydrate (35.7 g) and magnesium acetate tetrahydrate (10.7 g) in 300 mL 80:20 isopropanol-water. The resulting white gel was dried in a oven at 80° C. and calcined at 800° C. in air for 3 hours, then under 10% hydrogen in argon at 850° C. for 5 hours. 10 g of the resulting blue powder were mixed with 12 mL of a 13 wt % solution of the cellulose acetate in acetone. The paste was dried and the polymer carbonized in the conditions of Example 4 under inert atmosphere at 700° C.

The positive electrode of an electrochemical supercapacitor was built in the following manner. 5 g of carbon coated $LiFePO_4$ from Example 3, 5 g of Norit®, activated carbon, 4 g of graphite powder (2 μm diameter), 3 g of chopped (20 μm long aluminium fibers (5 mm diameter), 9 g of anthracene powder (10 μm) as a pore former and 6 g of polyacrylonitrile were mixed in dimethylformamide wherein the polymer dissolved. The slurry was homogenized and coated onto an aluminium foil (25 μm) and the solvent was evaporated. The coating was then slowly brought to 380° C. under nitrogen atmosphere. The anthracene evaporates to leave a homogeneous porosity in the material and the acrylonitrile undergoes thermal cyclization to a conductive polymer consisting of fused pyridine rings. The thickness of the resulting layer is 75 μm.

A similar coating is done for the negative electrode with a slurry where LiFePO$_4$ is replaced with the coated spinel as prepared above. The supercapacitor assembly is obtained by placing face to face the two electrodes prepared separated by a 10 μm-thick polypropylene separator soaked in 1 molar LiTFSI in acetonitrile/dimethoxyethane mixture (50:50). Tic device can be charged at 30 mAcm$^{-2}$ and 2.5 V and delivers a specific power of 3 kW/L$^{-1}$ at 1.8 V.

EXAMPLE 15

A light modulating device (electrochromic window) was constructed in the following manner.

LiFePO$_4$ from Example 3 was ball mulled in a high energy mill to particles of an average size of 120 nm. 2 g of the powder were mixed with a 1 mL of a 2 wt % solution of the perylene-co-polyoxyethylene polymer of Example 5 in methyl formate. The paste was triturated to ensure uniform distribution of the polymer at the surface of the particles, and the solvent was evaporated. The dry powder was treated under a stream of dry, oxygen-free nitrogen in a tubular furnace at 700° C. for three hours to yield a light gray powder.

1 g of the carbon coated powder was slurried in a solution of 1.2 g polyethyleneoxide-co-(2-methylene)propane-1,3-diyl prepared according to *J. Electrochem. Soc.*, 1994, 141(7), 1915 with ethylene oxide segments of molecular weight 1000, 280 mg of LiTFSI and 15 mg of diphenylbenzyl dimethyl acetal as photoinitiator in 10 mL of acetonitrile. The solution was coated using the doctor blade process onto an indium-tin oxide (ITO) covered glass (20 S$^{-1}$□) to a thickness of 8 μm. After evaporation of the solvent, the polymer was cured with a 254 nm UV light (200 mWcm$^{-2}$) for 3 minutes.

Tungsten trioxide was deposited by thermal evaporation nto another ITO covered glass to a thickness of 340 mL The device assembly was done by applying a layer of a polyethylene oxide (120 μm) electrolyte with LiTFSI in an oxygen (polymer) to salt ratio of 12, previously coated on a polypropylene foil and applied to the WO$_3$-coated electrode using the adhesive transfer technology. The two glass electrodes were pressed together to form the electrochemical chain:

glass/ITO/WO$_3$/PEO-LiTFSI/LiFePO$_4$ composite electrode/ITO/glass

The device turned blue in 30 seconds upon application of a voltage (1.5 volts, LiFePO$_4$ side being the anode) and bleached on reversal of the voltage. The light transmission is modulated from 85% (bleached state) to 20% (colored state).

While the invention has been described in connection with specific embodiments thereof, it will be understood that it is capable of further modifications, and this application is intended to cover any variations, uses or adaptations of the invention following, in general, the principles of the invention, and including such departures from the present description as come within known or customary practice within the art to which the invention pertains, and as may be applied to the essential features hereinbefore set forth, and as follows in the scope of the appended claims.

What is claimed is:

1. An electrode material that is reversible to alkaline ions comprising complex oxide corresponding to the general formula A$_a$M$_m$Z$_z$O$_o$N$_n$F$_f$ wherein:

A comprises an alkaline metal;
   M comprises at least one transition metal1 and optionally at least one a non-transition metal, or mixtures thereof;
   Z comprises at least one non-metal;
   O is a oxygen;
   N nitrogen; and
   F is fluorine; and
   the coefficients a, m, o, n, f$\geq$0 and z$\geq$0 and are selected to ensure electroneutrality, wherein said complex oxide comprises a non powdery coating of a conductive carbonaceous material on a surface thereof, said coating being effective to obtain a regular electric field distribution on the surface of particles of said complex oxide
   and wherein said coefficients are selected to avoid oxidation of the conductive carbonaceous a material during deposition thereof on said surface.

2. The material according to claim 1 wherein the carbonaceous a material deposit is obtained by pyrolysis of a carbonaceous material precursor.

3. The material according to claim 2, wherein the carbonaceous material precursor is selected from the group consisting of hydrocarbons and their de derivatives, perylene and its derivatives; polyhydric compounds and their derivatives; polymer or a mixture of polymers, and mixtures thereof.

4. The material according to claim 3 wherein the carbonaceous material precursor comprises a polymer.

5. The material according to claim 4 wherein the polymer is selected from the group consisting of polyolefins, polybutadienes, polyvinylic alcohol, phenol condensation products, polymers derived from furfurylic alcohol, polymer derivatives of styrene, divinylbenzene, acrylonitrile, vinyl acetate, cellulose, starch and its esters, and mixtures thereof.

6. The method according to claim 2, wherein said organic material precursor is in gaseous form and is selected from the group consisting of gaseous hydrocarbons, CO, CO precursors and mixtures thereof.

7. The material according to claim 6, wherein said organic material precursor in gaseous form includes hydrogen.

8. The material according to claim 6, wherein said organic material precursor in gaseous form is formed in situ during pyrolysis.

9. The material according to claim 2, wherein said carbonaceous material deposit is a carbon deposit and is obtained as a result of the disproportionation equilibrium reaction:

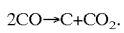

$$2CO \rightarrow C + CO_2.$$

10. The material according to claim 9, wherein said CO of said disproportionation equilibrium reaction is generated during the pyrolysis of said carbonaceous material precursor.

11. The material according to claim 9, wherein said CO of said disproportionation equilibrium reaction is said carbonaceous material precursor.

12. The material according to claim 1 wherein the transition metal is selected from the group consisting of iron, manganese, vanadium, titanium, molybdenum, niobium, tungsten, zinc and mixtures thereof, the non-transition metal is selected from the group consisting of magnesium and aluminum, and the non-metal is selected from the group consisting of sulfur, selenium, phosphorous, arsenic, silicon, germanium, boron, and mixtures thereof.

13. The material according to claim 12 wherein the transition metal is selected from the group consisting of Fe$^{2+}$, Mn$^{2+}$, V$^{2+}$, V$^{3+}$, Ti$^{2+}$, Ti$^{3+}$, Mo$^{3+}$, Mo$^{4+}$, Nb$^{3+}$, Nb$^{4+}$ and W$^{4+}$.

14. The material according to claim 1 wherein the final mass concentration of carbonaceous material is between 0.1 and 55%.

15. The material according to claim 1 wherein the non-metal of said complex oxide is selected from the group consisting of sulfates, phosphates silicates, oxysulfates, oxyphosphates, oxysilicates, and mixtures thereof, and the transition metal comprises lithium.

16. The material according to claim 1 wherein tile complex oxide is of the general formula $Li_{1+x}MP_{1-x}Si_xO_4$ or $Li_{1+x+y}MP_1S_xO_{4-y}F_y$ wherein $0 \leq x$, $y \leq 1$ and M comprises Fe or Mn.

17. The material according to claim 1 wherein the complex oxide is of general formula $Li_{3-x+z}M_2(P_{1-x-z}S_xSi_zO_4)_3$ wherein M comprises Fe or Mn, $0 \leq x$ and $z \leq 1$.

18. The material according to claim 1, wherein the complex oxide is of general formula $Li_{3+y-x+z}V_{2-z-w}Fe_yTi_w(P_{1-x-z}S_xSi_zO_4)_3$, $Li_{4+x}Ti_5O_{12}$, or $Li_{4+x-2y}Mg_yTi_5O_{12}$, wherein $x \geq 0$; $w \leq 2$; $y \leq 1$ and $z \leq 1$.

19. The material according to claim 1, wherein the value of coefficient "a" is selected such that the pressure of oxygen in equilibrium with the conductive a carbonaceous material is on the order of $10^{-20}$ bars at 0° C. and $10^{-10}$ bars at 900° C.

20. The material according to claim 19, wherein the pressure of oxygen in equilibrium with the conductive carbonaceous material is lower than the pressure of oxygen corresponding to the equilibrium $C+O_2 <=> CO_2$ in the temperature range between 100 and 900° C. during preparation of the material.

21. The material according to claim 19, wherein the pressure of oxygen in equilibrium with the conductive carbonaceous material is lower than the pressure of oxygen corresponding to the equilibrium $C+O_2 <=> CO_2$ in the temperature range between 100 and 750° C., during preparation of the material.

22. The material according to claim 21, wherein the pressure of oxygen of the gaseous phase in contact with the conductive carbonaceous material is imposed by the equilibrium $C+O_2 <=> CO_2$ in the temperature range between 100 and 900° C. during preparation of the material.

23. The material according to claim 21, wherein the pressure of oxygen of the gaseous phase in contact with the conductive carbonaceous material is imposed by the equilibrium $C+O_2 <=> CO_2$ in the temperature range between 100 and 750° C. during preparation of the material.

24. The material according to claim 1, wherein the material comprises one of (i) a phosphate and (ii) a silicophosphate including the tryphilite a structure, corresponding to the formula $Li_{1+x}MP_{1-x}Si_xO_4$ or $Li_{1-x-y}MP_{1-x}Si_xO_{4-y}F_y$ wherein $0 \leq x$, $y \leq 1$, and M comprises Fe or Mn.

25. The material according to claim 1, wherein the material comprises one of (i) a phosphate and (ii) a silicophosphate including the tryphilite structure, corresponding to the formula $Li_{3-x+z}M_2(P_{1-x-z}S_xSi_zO_4)_3$ wherein M comprises Fe or Mn, $0 \leq x$, and $z \leq 1$.

26. The material according to claim 1, wherein the material comprises a complex oxide, corresponding to the formulae $Li_{3+y-x+z}V_{2-z-w}Fe_yTi_w(P_{1-x-z}S_xSi_zO_4)_3$, $Li_{4+x}Ti_5O_{12}$, or $Li_{4+x-2y}Mg_yTi_5O_{12}$, wherein $x \geq 0$; $w \leq 2$; $y \leq 1$ and $z \leq 1$.

27. The material according to claim 1, wherein said coating is structurally integral.

28. The material according to claim 1, wherein said coating partly covers the surface of said particles, thereby allowing said regular electric field distribution.

29. The material according to claim 1, wherein said coating is sufficiently thin to allow passage of ions therethrough while ensuring said regular electric distribution on the surface of said particles.

30. The material according to claim 1, wherein the coating of conductive carbonaceous material is substantially uniform.

31. An electrode material comprising a complex oxide corresponding to the general formula $A_aM_mZ_zO_oN_nF$ wherein:

A comprises an alkaline meal;

M comprises at least one transition metal, and optionally at least one of a non-transition metal, or mixtures thereof;

Z comprises at least one non-metal;

O is oxygen;

N is nitrogen; and

F is fluorine; and the coefficients a, m, z, o, n, $f \geq 0$ and $z > 0$ and are selected to ensure electroneurality, wherein said complex oxide comprises a non powdery, uniform coating of a conductive carbonaceous material on a surface thereof, said coating being effective to obtain a regular electric field distribution on the surface of particles of said complex oxide and wherein said coefficients are selected to avoid oxidation of the conductive carbonaceous material during deposition thereof on said surface, prepared by a) providing the complex oxide defined above, where Z and O are such that the complex oxide is selected from the group consisting of sulfates, phosphates, silicates, oxysulfates, oxyphoaphates or oxysilicates and mixtures thereof; where $a \geq 0.1$; m, o and $z > 0$; and n and $f \geq 0$ and selected to ensure electroneutrality in said complex oxide; wherein said alkali-based complex oxide stabilizes all or part of the transition metal ion of in its lower oxidation level (not considering 0) and conducts alkali metal ions; and b) contacting said complex oxide with a carbonaceous precursor under conditions of temperature, time and pressure effective to give a conductive carbon coating on said complex oxide, said carbon coating being in a non powdery form, substantially homogeneous and covering all or most of the surface with a thin film of carbon that is optimized to give electronic conductivity in said complex oxide, without blocking alkali ion exchanges at the surface of said material and without reducing the transition metal of said alkali-based complex oxide to a metallic state, the carbon coated alkali-based complex oxide having mixed electron and alkali-ion conductivity and alkali-ion-exchange capability for use in a battery.

32. The material according to claim 31, wherein said alkali-based complex oxide is provided by pyrolysing at least one complex oxide precursor under conditions effective to give said complex oxide.

33. The material according to claim 32, wherein pyrolysing the at least one complex oxide precursor is carried out simultaneously with the formation of the carbon coating on said complex oxide.

34. The material according to claim 31, wherein step (b) is carried out by heating and pyrolysing said carbonaceous precursor in the presence of said complex oxide.

35. The material according to claim 34, wherein said pyrolysing step is carried out under vacuum.

36. The material according to claim 34, wherein said pyrolysing step is carried out under non oxidizing conditions.

37. The material according to claim 34, wherein said pyrolysing step is carried out under reducing conditions.

38. The material according to claim 34, wherein said carbonaceous material precursor is in a form selected from the group consisting of solid, liquid, and gas.

39. The material according to claim 38, wherein said carbonaceous material precursor is in solid form, and is selected from the group consisting of a polymer, a solid hydrocarbon, and derivatives and mixtures thereof.

40. The material according to claim 39, wherein said carbonaceous material precursor is in solid form and comprises a polymer.

41. The material according to claim 40, wherein said polymer is selected from the group consisting at polyolefins, polybutadienes, polyvinylic alcohol, phenol condensation products, polymers derived from furfurylic alcohol, polymers derivatives of styrene, divinylbenzene, acrylnitrile, vinyl acetate, cellulose, starch and its esters, and mixtures thereof.

42. The material according to claim 40, wherein the step of pyrolysing said carbonaceous material precursor further comprises the step of dispersing a polymer or polymer mixture with said complex oxide or with precursors of said complex oxide, and pyrolysing the dispersion to obtain said electrode material.

43. The material according to claim 39, wherein said pyrolysing generates CO and is carried out under conditions to obtain a carbon deposit as a result of the disproportionation equilibrium reaction:

$$2CO \rightarrow CO_2.$$

44. The material according to claim 38, wherein said carbonaceous material precursor material is in liquid form and is selected from the group consisting of a liquid solution of a polymer, a liquid, a liquid monomer, a liquid hydrocarbon, and mixtures an derivatives thereof.

45. The material according to claim 38, wherein said carbonaceous material precursor is in gaseous form and is selected from the group consisting of gaseous hydrocarbons, CO, CO precursors, and mixtures thereof.

46. The material according to claim 45, wherein said carbonaceous material precursor in gaseous form includes hydrogen.

47. The material according to claim 45, wherein said carbonaceous precursor in gaseous form is formed in situ during pyrolysis.

48. The material according to claim 47, wherein said pyrolysing is carried out at a temperature lower than 900° C.

49. The material according to claim 45, wherein said pyrolysing is carried out with CO under conditions to obtain a carbon deposit as a result of the disproportionation equilibrium reaction:

$$2CO \rightarrow CO_2.$$

50. The material according to claim 31, wherein step (b) is carried out by heating and pyrolyzing said carbonaceous precursor in the presence of alkali-based complex oxide precursors.

* * * * *

UNITED STATES PATENT AND TRADEMARK OFFICE
CERTIFICATE OF CORRECTION

| | |
|---|---|
| PATENT NO. | : 6,962,666 B2 |
| APPLICATION NO. | : 10/740449 |
| DATED | : November 8, 2005 |
| INVENTOR(S) | : Nathalie Ravet et al. |

It is certified that error appears in the above-identified patent and that said Letters Patent is hereby corrected as shown below:

On the title page, item (57) Abstract:

After "electrode materials capable of redox reactions by", insert --electron and alkali-ion-- and delete "electrons and alkaline ions";

After "electrochemical generators,", insert --supercapacitors-- and delete "super capacitors";

After "light modulating", insert --systems-- and delete "system";

After "system of the", insert --electrochromic-- and delete "super capacitor.".

Specification:

Column 1, line 11: After "redox reactions by", insert --electron and alkali-ion-- and delete "electrons and alkaline ions".

Column 1, line 14: After "light modulating", insert --systems-- and delete "system".

Column 1, line 21: After "based on the exchange of", insert --alkali-- and delete "alkaline".

Column 1, line 34: After "components used", insert --,--; After "in particular", insert --,--.

Column 1, line 36: After "light transmission modulating", insert --systems-- and delete "system".

Column 1, line 41: After "these conductivities", insert --which may be-- and delete "being eventually".

Column 1, line 60: After "exchanges, it is", insert --customary-- and delete "usual".

Specification:

Signed and Sealed this
Thirteenth Day of October, 2015

Michelle K. Lee
*Director of the United States Patent and Trademark Office*

CERTIFICATE OF CORRECTION (continued)
U.S. Pat. No. 6,962,666 B2

Column 1, line 66-67: After "because such material", insert --strongly modifies-- and delete "modifies strongly".

Column 1, line 67: After "rheology", insert --of--.

Column 2, line 23: After "stresses", delete ","; After "result", insert --,--.

Column 2, line 24: After "microscopic level", insert --,--.

Column 2, line 25: After "a part of which", insert --become-- and delete "being".

Column 2, line 26: After "susceptible to", insert --losing-- and delete "lose the".

Column 2, line 29: After "and", insert --possible-- and delete "eventual".

Column 2, line 39: After "a carbonaceous deposit", insert --and-- and delete ", with".

Column 2, line 42: After "20", insert --mV·h-1-- and delete "mV.h-1"; After "3.7", insert --V-- and delete "volts".

Column 2, line 43: After "is shown", insert --in-- and delete "on"; After "the fifth", insert --in-- and delete "on".

Column 2, line 53: After "20", insert --mV·h-1-- and delete "mV.h-1".

Column 2, line 60: After "LiFePO4 samples", insert --,--.

Column 2, line 62: After "20", insert --mV·h-1-- and delete "mV.h-1".

Column 2, line 63: After "3.7", insert --V-- and delete "volts"; After "is shown", insert --in-- and delete "on".

Column 2, line 64: After "the fifth", insert --in-- and delete "on".

Column 3, line 6: After "A comprises an", insert --alkali-- and delete "alkaline".

Column 3, line 11: After "O is oxygen", insert --,-- and delete ";"; After "N", insert --is--.

Column 3, line 19: After "For simplicity", insert --,--.

Column 3, line 21: After "materials are", insert --hereinafter-- and delete "thereafter".

Column 3, line 25: After "non-transition metals", insert --comprise-- and delete "comprises".
Specification:

CERTIFICATE OF CORRECTION (continued)
U.S. Pat. No. 6,962,666 B2

Column 3, line 34: After "oxyphosphates", insert --and-- and delete ","; After "oxysilicates", delete "and mixtures thereof".

Column 3, line 36: After "purposes, to", insert --partially replace-- and delete "replace partially".

Column 3, line 38: After "ionic radius", insert --,--.

Column 3, line 40: After "25%", insert --may be used--.

Column 3, line 55: After "when compared to", insert --contact points-- and delete "a punctual contact".

Column 3, line 59: Before "concentration gradients", insert --ion-- and delete "ions".

Column 3, line 61: After "allows", insert --,--; After "on one side", insert --,--.

Column 3, line 63: After "on the other side", insert --,--.

Column 3, line 65: After "of the greater surface", insert --accessibility-- and delete "accessible".

Column 4, line 4: After "oxygen,", insert --and--.

Column 4, line 11: After "complex oxide", delete ",".

Column 4, line 15: After "and tar derivatives", insert --;-- and delete ",".

Column 4, line 21: After "alcohol,", insert --polymer-- and delete "polymers".

Column 4, line 22: After "vinyl acetate", insert --,-- and delete ";".

Column 4, line 27: Before "of electrodes containing electroactive materials", insert --operation-- and delete "operations".

Column 4, line 30: After "couples in", insert --a--.

Column 4, line 30-31: After "and/or using", insert --inexpensive or nontoxic elements-- and delete "elements inexpensive or nontoxic".

Column 4, line 32: After "would be", insert --too-- and delete "to".

Column 4, line 36: After "thus much wider than that", insert --of-- and delete "with".

Column 4, line 38: After "is", delete "particularly".
Specification:

Column 4, line 48: After "A comprises an", insert --alkali-- and delete "alkaline".

Column 4, line 50: After "least one", delete "a".

Column 4, line 56: After "complex oxide because", delete "of".

Column 5, line 4: Before "of easily forming", insert --capable-- and delete "susceptible".

Column 5, line 13: After "from the material", insert --is-- and delete "be".

Column 5, line 16: After "the concentration of", insert --alkali-- and delete "alkaline".

Column 5, line 20: After "coefficient "a" of the", insert --alkali-- and delete "alkaline".

Column 5, line 23: After "oxygen pressures", insert --on-- and delete "in"; After "and", insert --of-- and delete "de".

Column 5, line 25: After "pyrolysis, the", insert --kinetics-- and delete "kinetic".

Column 5, line 30: After "with the materials that", insert --are-- and delete "is".

Column 5, line 40: Delete "273,2" and insert --273.2--.

Column 5, line 43: After "the perfect gas constant(", insert --1.987 cal·mole-1·K-1-- and delete "1,987 cal.mole-1.K-1".

Column 5, line 66: After "with carbon monoxide", insert --,--.

Column 6, line 6: After "It can be", delete "interesting" and insert --advantageous--.

Column 6, line 11: After "hydrocarbons in", delete "the"; After "gaseous", insert --form-- and delete "forms".

Column 6, line 18: After "composition of", insert --alkali metal-- and delete "alkaline metals".

Column 6, line 23: After "and the", insert --alkali-- and delete "alkaline".

Column 6, line 28: After "R' being an organic radical,", insert --which may be-- and delete "eventually".

Column 6, line 36: After "of an", insert --alkali-- and delete "alkaline"; After "with an", insert --alkali-- and delete "alkaline".

Specification:

Column 6, line 48: Before "of existing in the form", delete "susceptible" and insert --capable--; After "Y31 and", insert --forming-- and delete "formed.".

Column 6, line 56: After "These reagents can", insert --optionally-- and delete "eventually".

Column 6, line 58: After "to use catalysts", insert --to increase-- and delete "increasing"; After "the reduction", insert --kinetics-- and delete "kinetic".

Column 6, line 64: After "Compounds", insert --capable-- and delete "susceptible".

Column 7, line 1: After "Another way to", insert --release-- and delete "free".

Column 7, line 7: After "Compounds", insert --capable-- and delete "susceptible".

Column 7, line 13: After "obtained at low", insert --temperatures-- and delete "temperature".

Column 7, line 15: Before "of suitable bases", delete "Example" and insert --Examples--; After "include tertiary", insert --bases-- and delete "basis".

Column 7, line 17: Delete "alkaline" and insert --alkali--.

Column 7, line 29: After "same order", insert --as-- and delete "than".

Column 7, line 33: After "material, and the", insert --liquid or polymeric electrolyte-- and delete "electrolyte, liquid or polymeric".

Column 7, line 36: After "Generally, such", insert --behavior-- and delete "behaviour".

Column 7, line 42: After "the binary mixtures", insert --possibly-- and delete "eventually".

Column 7, line 56-57: After "polymers", insert --,--.

Column 7, line 58: After "hydrocarbons", insert --,--.

Column 7, line 64: Before "resistance", delete "increase" and insert --increased--.

Column 8, line 7: After "in the form of", insert --a--; After "sheet or", delete "eventually" and insert --possibly--.

Column 8, line 10: After "in the case of", insert --expanded-- and delete "expended".

Column 8, line 12: After "take place without", insert --a--.

Specification:

CERTIFICATE OF CORRECTION (continued)
U.S. Pat. No. 6,962,666 B2

Column 8, line 15: After "collector", delete "," and insert --so as--.

Column 8, line 19: Before "The formation of porous films", delete "polymerisation" and insert --polymerization--.

Column 8, line 20: After "carbonaceous coating forms a chain", delete "are" and insert --is--.

Column 8, line 25: Before "an electrochemical cell", delete "into" and insert --in--.

Column 8, line 32: After "methacrylic acid esters,", insert --or--.

Column 8, line 36: After "lithium aluminate", insert --(LiAlO2)-- and delete "LiAlO2".

Column 8, line 40-41: After "preferred", insert --embodiments-- and delete "embodiment".

Column 8, line 50: Delete "Fe3(PO4)2 .8H2O" and insert --(Fe3(PO4)2 • 8H2O)--.

Column 8, line 51: After "orthophosphate", delete "Li3PO4" and insert --(Li3PO4)--.

Column 8, line 56: After "The three components", insert --are intimately--.

Column 8, line 57: After "mixed together", delete "intimately".

Column 8, line 59: After "argon,", insert --first-- and delete "firstly".

Column 8, line 60: After "the temperature is", insert --increased-- and delete "risen".

Column 9, line 9: After "The cathode", insert --was-- and delete "were".

Column 9, line 13: After "weight of", insert --400,000-- and delete "400 000".

Column 9, line 22: After "of weight", insert --5,000,000-- and delete "5 000 000".

Column 9, line 26: After "80°C", insert --the--.

Column 9, line 28: After "20", insert --mV·h-1-- and delete "mV.h-1".

Column 9, line 34: After "extend", delete "trail".

Column 9, line 45: After "170", insert --mAhg-1-- and delete "mAh.g-1".

Column 9, line 47: After "145", insert --mAhg-1-- and delete "mAh.g-1".

Specification:

Column 9, line 52: After "mode between", insert --3.8-- and delete "38".

Column 9, line 61: After "120", insert --mAhg-1-- and delete "mAh.g-1".

Column 9, line 63: After "950 cycles", insert --shows-- and delete "show".

Column 9, line 64: After "at slower", insert --discharge-- and delete "discharges".

Column 10, line 1: After "passed during discharging)", insert --becomes-- and delete "become".

Column 10, line 9: After "cyclohexane) in", insert --a--; After "ratio", insert --of--.

Column 10, line 14: After "The electrolyte used", insert --is-- and delete "in".

Column 10, line 17: After "20", insert --mV·h-1-- and delete "mV.h-1".

Column 10, line 18: After "reduction kinetics", insert --appear-- and delete "appears".

Column 10, line 45-46: After "Example 1", delete "de carbon".

Column 10, line 56: After "carbon layer", insert --, which may be-- and delete "eventually"; After "porous", insert --,--.

Column 10, line 59: After "lithium iron phosphate", insert --(LiFePO4)-- and delete "LiFePO4".

Column 10, line 65: After "34.6", insert --%--; After "19.2", insert --%--.

Column 11, line 2: After "sucrose", delete ",".

Column 11, line 8: After "thereby", insert --providing-- and delete "provided".

Column 11, line 18: After "measured on the", insert --1st-- and delete "1rst".

Column 11, line 43: Delete "1rst" and insert --1st--.

Column 11, line 53: After "graphitic-type carbons", delete ",".

Column 11, line 66: After "at high", insert --temperatures-- and delete "temperature".

Column 12, lines 16-17: After "wherein", insert
--R = —[CH(CH3)CH2O—]p(CH2CH2O—)q[CH2—CH(CH)3O]p-1CH2—CH(CH)3— -- and delete "R = —[CH(CH3)CH2O—]p(CH2CH2O—)q[CH2—CH(CH)3O]p-1CH2—CH(CH)3-".

Specification:

Column 12, line 27: After "of this product is", insert --on-- and delete "of".

Column 12, line 33: Delete "1rst" and insert --1st--.

Column 12, line 43: After "carbonaceous deposit according", delete "of" and insert --to--.

Column 12, line 45: After "ferric iron sulfate", insert --(Fe2(SO4)3)-- and delete "Fe2(SO4)3".

Column 12, line 51: After "resulting", delete "off-"; After "100", insert --mL-- and delete "ml".

Column 12, line 52: After "2.2", delete "gram" and insert --g--.

Column 12, line 59: After "and", delete "is".

Column 12, line 62: After "400°", insert --C--.

Column 13, line 4: Delete "KetjenblackTM" and insert --Ketjenblack®--.

Column 13, line 10: After "3.9", insert --V-- and delete "volts".

Column 13, line 17: After "compound as", insert --an--.

Column 13, line 18: After "powdered manganous oxide", insert --(MnO)-- and delete "MnO".

Column 13, line 21: After "and treated under", insert --oxygen-free-- and delete "oxygen free".

Column 13, line 24: After "polyethylene powder and", insert --ball milled-- and delete "ball-milled".

Column 13, line 25: After "dry heptane as", insert --the--.

Column 13, line 26: After "(ICI) as", insert --the--.

Column 13, line 40: After "molar solution", insert --Similar-- and delete "Similarly".

Column 13, line 46: After "mixed with", delete "KetjenblackTM" and insert --Ketjenblack®--.

Column 13, line 52: After "1.8", delete "volts" and insert --V--; After "1.8 volts. The" insert --material's-- and delete "materials".

Column 13, line 56: Before "negative", insert --a--.

Column 13, line 64: After "used as", insert --an--.

Specification:

Column 13, line 65: After "2.1", insert --V-- and delete "volts".

Column 14, lines 3-4: After "phosphosilicate", insert --(Li3.5V2(PO4)2.5(SiO4)0.5)-- and delete "Li3.5V2(PO4)2.5(SiO4)0.5".

Column 14, line 6: After "lithium silicate", insert --(Li2SiO3)-- and delete "Li2SiO3".

Column 14, line 31: After "mixed with", delete "KetjenblackkTM" and insert --Ketjenblack®--.

Column 14, line 36: After "corresponding to", insert --an-- and delete "a".

Column 14, line 39: After "4.1", insert --V-- and delete "volts".

Column 14, line 41: After "formula),", insert --slowly-- and delete "with a slow".

Column 14, line 43: After "using", delete "instead".

Column 14, line 57: Before "treated", insert --was-- and delete "is".

Column 14, line 63: After "difference", insert --being--.

Column 14, line 65: After "3.7", delete "."; After "3.7", insert --V-- and delete "volts".

Column 15, line 8: After "example", insert --also--; After "illustrates", delete "also".

Column 15, line 11: After "molecular weight", insert --15,000-- and delete "15 000".

Column 15, line 15: Before "80", delete "a" and insert --at--.

Column 15, line 25: Before "nitrogen", insert --oxygen-free-- and delete "oxygen-force".

Column 15, line 48: After "in a mortar with", delete "a".

Column 15, line 55: After "electrolyte was", insert --,--; After "in this case", insert --,--.

Column 15, lines 58-59: After "sulfamate", insert --(CF3CH2OSO2N(CH3)2)-- and delete "CF3CH2OSO2N(CH3)2".

Column 16, line 19: After "The uncoated material", insert --,--.

Column 16, line 20: After "tested in similar condition", insert --,--.

Column 16, line 27: After "Under vigorous stirring", delete "was added dropwise".
Specification:

CERTIFICATE OF CORRECTION (continued)
U.S. Pat. No. 6,962,666 B2

Column 16, line 28: After "tetrakis(dimethylamino)ethylene", insert --was added dropwise--.

Column 16, line 30: After "more reducing agent", insert --was-- and delete "has been".

Column 16, line 35: Before "gas", delete "oxygen free" and insert --oxygen-free--.

Column 16, line 45: After "The spinel", delete "compounds" and insert --compound--.

Column 16, line 49: After "was dried in", insert --an-- and delete "a".

Column 16, line 56-57: Before "was built", insert --super capacitor-- and delete "super-capacitor".

Column 16, lines 57-58: After "5 g of", insert --carbon-coated-- and delete "carbon coated".

Column 16, line 58: After "Norit®", delete ",".

Column 16, line 60: After "chopped", insert --aluminum fibers--; After "20 μm long", delete "aluminum fibers(" and insert --and--.

Column 16, line 64: After "and coated onto", delete "an".

Column 16, line 67: After "anthracene", insert --evaporated-- and delete "evaporates".

Column 17, line 1: After "acrylonitrile", insert --underwent-- and delete "undergoes".

Column 17, line 7: "face to face the two electrodes prepared" should read "the two prepared electrodes face to face".

Column 17, line 19: After "mixed with", delete "a".

Column 17, line 27: After "1 g of the", delete "carbon coated" and insert --carbon-coated--.

Column 17, line 50: After "1.5", insert --V-- and delete "volts".

Claims:

Column 17, line 65, claim 1: After "that is reversible to", delete "alkaline" and insert --alkali--.

Column 18, line 1, claim 1: After "A comprises an", delete "alkaline" and insert --alkali--.

Column 18, line 3, claim 1: After "at least one", delete "a".

Column 18, line 6, claim 1: After "N", insert --is--.
Claims:

CERTIFICATE OF CORRECTION (continued)

U.S. Pat. No. 6,962,666 B2

Column 18, line 59, claim 12: After "and mixtures thereof", delete "," and insert --;--.

Column 18, line 61, claim 12: After "aluminum", delete "," and insert --;--.

Column 20, line 9, claim 31: After "A comprises an", delete "alkaline" and insert --alkali--.

Column 20, line 11, claim 31: After "at least one", delete "of a".

Column 21, line 14, claim 41: Before "derivatives of styrene", delete "polymers" and insert --polymer--.

Column 21, line 19, claim 42: Before "said carbonaceous", delete "pyrolysing" and insert --pyrolyzing--.